(12) United States Patent
Chaper et al.

(10) Patent No.: US 9,915,285 B2
(45) Date of Patent: Mar. 13, 2018

(54) UNIVERSAL JOINT WITH SIMPLIFIED STRUCTURE

(71) Applicant: AIRBUS OPERATIONS (S.A.S.), Toulouse (FR)

(72) Inventors: Camille Chaper, Toulouse (FR); David Blain, Toulouse (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 0 days.

(21) Appl. No.: 15/466,252

(22) Filed: Mar. 22, 2017

(65) Prior Publication Data

US 2017/0276187 A1    Sep. 28, 2017

(30) Foreign Application Priority Data

Mar. 22, 2016 (FR) ...................... 16 52432

(51) Int. Cl.
*F16C 11/12* (2006.01)
*F16D 3/56* (2006.01)

(52) U.S. Cl.
CPC ............... *F16C 11/12* (2013.01); *F16D 3/56* (2013.01); *Y10T 403/32008* (2015.01); *Y10T 403/453* (2015.01)

(58) Field of Classification Search
CPC ........ F16B 7/00; F16B 7/0406; F16B 7/0413; F16C 11/12; F16D 3/56; F16D 3/58; G01C 19/22; Y10T 403/32008; Y10T 403/32606; Y10T 403/45; Y10T 403/453; Y10T 403/54

USPC ............ 464/51, 78, 81, 84, 86; 403/53, 119, 403/220, 223, 291; 267/133, 160
See application file for complete search history.

(56) References Cited

U.S. PATENT DOCUMENTS

| 1,602,912 | A | * | 10/1926 | Leipert | ..................... F16D 3/62 464/56 |
| 1,952,970 | A | * | 3/1934 | Brofelth | ................... F16D 3/56 464/81 |
| 3,081,991 | A | | 3/1963 | Swainson | |
| 3,277,555 | A | * | 10/1966 | Kutash | .................... F16C 11/12 267/160 |
| 3,360,255 | A | | 12/1967 | Ormond | |
| 3,427,828 | A | | 2/1969 | Stiles | |
| 3,499,299 | A | | 3/1970 | Hector | |
| 3,722,296 | A | * | 3/1973 | Hurlburt | ................. F16C 11/12 384/2 |

(Continued)

FOREIGN PATENT DOCUMENTS

DE    3241373 A1    5/1984

OTHER PUBLICATIONS

French Search Report for Application No. 1652433 dated Dec. 14, 2016.

(Continued)

*Primary Examiner* — Josh Skroupa
(74) *Attorney, Agent, or Firm* — Jenkins, Wilson, Taylor & Hunt, P.A.

(57) ABSTRACT

A universal joint includes a first band and a second band which are separated by a slot, are cylindrical and coaxial with one another with respect to a common axis, and further includes a first torsion bar, whose ends are joined to the first band, and a second torsion bar whose ends are joined to the second band.

6 Claims, 2 Drawing Sheets

(56) References Cited

U.S. PATENT DOCUMENTS

| | | | | |
|---|---|---|---|---|
| 3,807,029 A | * | 4/1974 | Troeger | B23H 9/00 |
| | | | | 267/160 |
| 3,813,089 A | * | 5/1974 | Troeger | F16C 11/12 |
| | | | | 267/160 |
| 4,405,184 A | * | 9/1983 | Bahiman | F16C 11/12 |
| | | | | 403/291 |
| 4,438,655 A | | 3/1984 | Quermann | |
| 4,802,784 A | * | 2/1989 | Brooks | F16C 11/12 |
| | | | | 267/160 |
| 4,812,072 A | * | 3/1989 | Brooks | F16C 11/12 |
| | | | | 403/24 |
| 5,061,107 A | | 10/1991 | Brooks | |
| 5,529,277 A | | 6/1996 | Ostaszewski | |
| 2017/0276188 A1 | | 9/2017 | Chaper et al. | |

OTHER PUBLICATIONS

French Search Report for Application No. 1652432 dated Dec. 14, 2016.
Preinterview First Office Action for U.S. Appl. No. 15/466,478 dated Aug. 31, 2017.

* cited by examiner

UNIVERSAL JOINT WITH SIMPLIFIED STRUCTURE

CROSS-REFERENCE TO RELATED APPLICATION

This patent application claims the benefit of and priority to French patent application number FR 16 52432, filed on Mar. 22, 2016, the entire disclosure of which is incorporated by reference herein.

TECHNICAL FIELD

The present disclosure relates to a universal joint having a simplified structure, i.e. having a reduced number of constituent parts and without frictional relative movement.

BACKGROUND

A universal joint is a mechanical component which makes it possible to connect two elements such as shafts or tubes which may move relative to one another.

A universal joint includes a first axis which is aligned between the two elements. The universal joint permits two rotations, the axes of which are perpendicular to one another and perpendicular to the first axis.

A universal joint includes a number of parts that are movable relative to one another, which makes the joint bulky and generally heavy and also costly to produce.

SUMMARY

The present subject matter has an object of disclosing a universal joint of simplified structure which does not have the disadvantages of the prior art and which in particular has a simple structure.

To that end, there is provided a universal joint comprising:
a first band;
a second band, the two bands being cylindrical bands coaxial with one another with respect to a common axis, the first band and the second band being separated by a slot; and
a first and a second torsion bar which extend inside the bands in a single plane P perpendicular to the common axis, and which are joined to one another and intersect at right angles at the common axis, each torsion bar having a first end and a second end, in which, for the first torsion bar, the first and second ends are joined to the first band, and in which, for the second torsion bar, the first and second ends are joined to the second band.

A universal joint of this type thus makes it possible to provide articulation by elastic deformation with a simplified structure.

Advantageously, the universal joint also comprises a first and a second stiffener which extend inside the bands, the first stiffener extending in a plane containing the common axis and the axis of the first torsion bar, the second stiffener extending in a plane containing the common axis and the axis of the second torsion bar, each stiffener having a first end and a second end, the first and second ends of the first stiffener being joined to the first band, and the first and second ends of the second stiffener being joined to the second band.

Advantageously, each torsion bar is merged with the stiffener which is joined to the same band.

Advantageously, each torsion bar has a first diameter at each end and at a region where the two torsion bars meet, and a second diameter, smaller than the first diameter, between each end and the meeting region.

BRIEF DESCRIPTION OF THE DRAWINGS

The abovementioned features of the disclosure herein, as well as others, will become more clearly apparent upon reading the following description of an exemplary embodiment, the description being given with reference to the appended FIGS. 1 and 2 of drawings, where.

DETAILED DESCRIPTION

Figure 1:
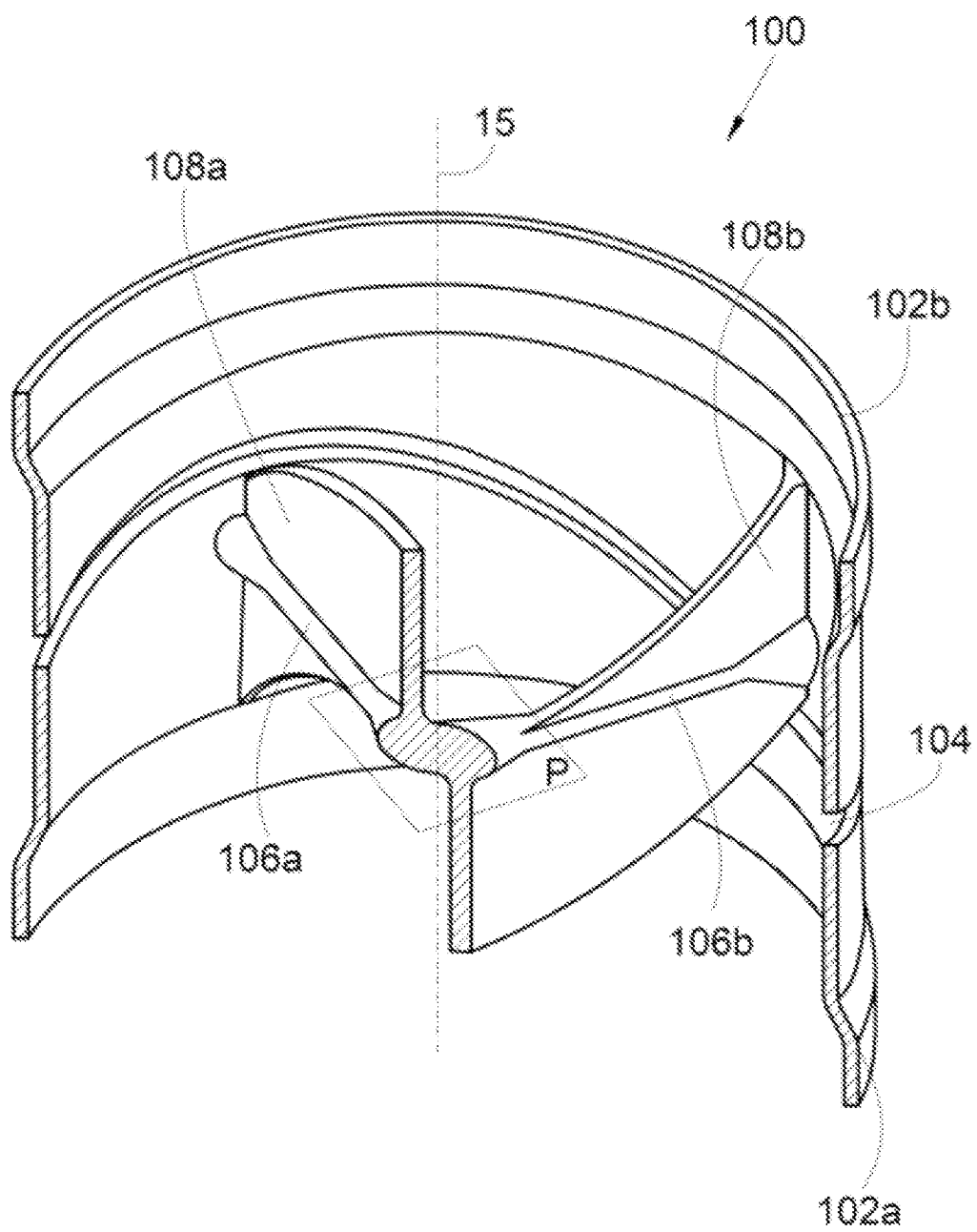
FIG. 1 is a perspective section view of a universal joint according to the disclosure herein, and where
Figure 2:
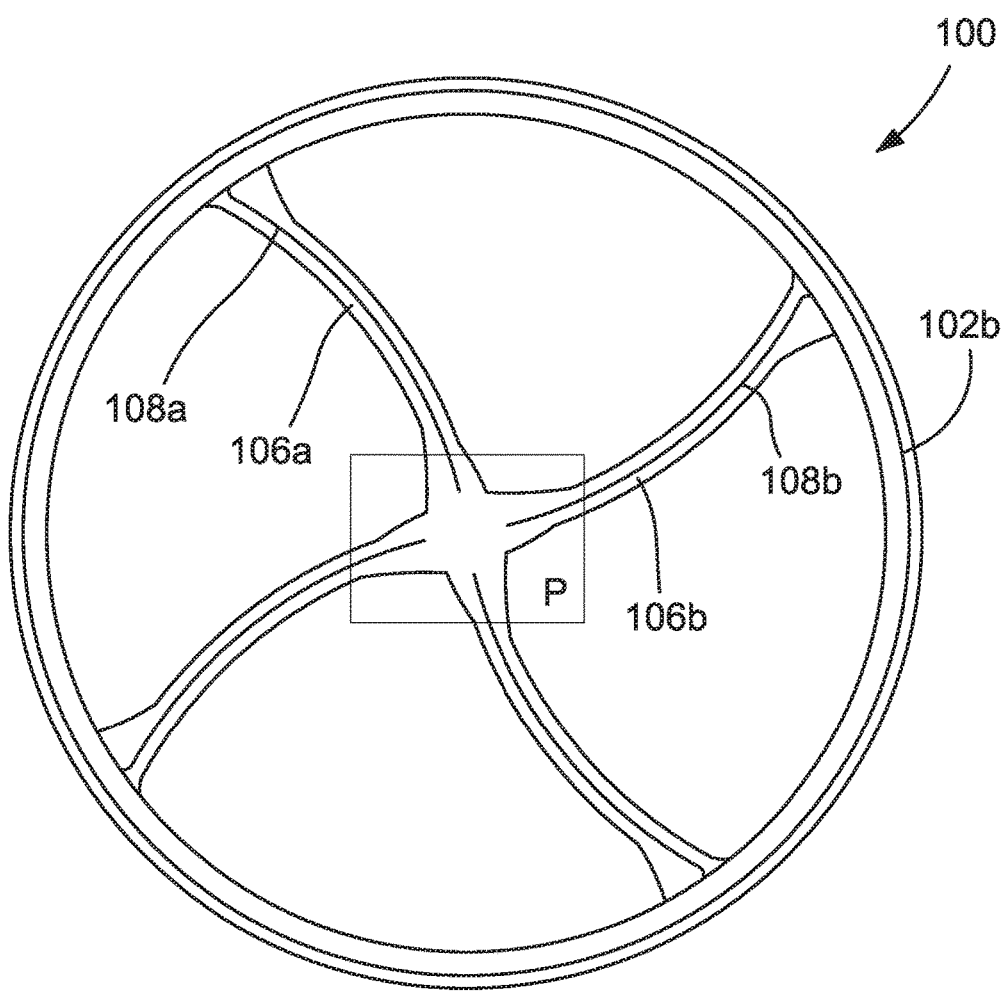
FIG. 2 is a top view of the universal joint of FIG. 1, according to the disclosure herein.

FIG. 1 shows a universal joint 100 in the general shape of an axisymmetric cylinder whose axis is labelled 15.

The universal joint 100 comprises a first band 102a and a second band 102b. The two bands 102a-b are cylindrical bands which are coaxial with one another and which are arranged adjacent to one another in the direction of their common axis 15.

A slot 104 separates the first band 102a from the second band 102b.

In order to ensure that the bands 102a-b are held together, the universal joint 100 comprises a first and a second torsion bar 106a-b which extend inside the bands 102a-b in a single plane P perpendicular to the common axis 15.

The two torsion bars 106a-b are joined to one another and intersect at right angles at the common axis 15.

Each torsion bar 106a-b has a first end and a second end. For the first torsion bar 106a, the first and second ends are joined to the first band 102a, and for the second torsion bar 106b, the first and second ends are joined to the second band 102b.

When the universal joint 100 is loaded, the torsion bars 106a-b deform in torsion. Each torsion bar 106a-b tends to deform by twisting about its axis. The combination of deformations about the two axes permits deformation about an axis coplanar with the two torsion bars 106a-b.

A universal joint 100 of this type thus has a simple shape without elements that move with respect to one another.

In order to bear a tensile force between the bands 102a and 102b, stiffeners may be integrated.

Thus, the universal joint 100 comprises a first and a second stiffener 108a-b which extend inside the bands 102a-b. Each stiffener 108a-b is in the form of a blade.

The first stiffener 108a extends in a plane containing the common axis 15 and the axis of the first torsion bar 106a. The second stiffener 108b extends in a plane containing the common axis 15 and the axis of the second torsion bar 106b.

As for the torsion bars 106a-b, each stiffener 108a-b has a first end and a second end. For the first stiffener 108a, the first and second ends are joined to the first band 102a, and for the second stiffener 108b, the first and second ends are joined to the second band 102b.

The stiffeners 108a-b make it possible to stiffen the universal joint 100 in order to bear the force due to compression (force along the axis 15). The stiffeners 108a-b have high stiffness along the common axis 15 but are thin enough to be flexible in the other directions and thus allow a pivoting connection.

Each torsion bar 106a-b is merged with the stiffener 108a-b which is joined to the same band 102a-b. That is to say that the first torsion bar 104a is embedded in the first stiffener 108a and the second torsion bar 104b is embedded in the second stiffener 108b. In particular, they are merged at the common axis 15 in order to transmit the tensile force linked to the compression.

In order to attach the torsion bars 106a-b and the stiffeners 108a-b to the bands 102a-b, the slot 104 has a profile that rises and falls, which allows each band 102a-b to pass successively from one side of the plane P to the other.

In other words, in the embodiment of the disclosure herein shown in the FIG. 1, when the first band 102a passes above the plane P, the first bar 106a and the first stiffener 108a are joined to the first band 102a at this passage. In the same way, when the second band 102b passes below the plane P, the second bar 106b and the second stiffener 108b are joined to the second band 102b at this passage.

In the embodiment of the disclosure herein presented here, the overall profile of the slot 104 is sinusoidal.

In the embodiment of the disclosure herein shown in FIG. 1, each torsion bar 106a-b has a first diameter at each end and at the region where the two torsion bars 106a-b meet, and a second diameter, smaller than the first diameter, between each end and the meeting region.

Depending on the forces to which it is likely to be subjected, the universal joint 100 may be made of any appropriate material such as metal or plastic.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A universal joint comprising:
a first band;
a second band, the first and second bands being cylindrical bands coaxial with one another with respect to a common axis, the first band and the second band being separated by a slot; and
a first and a second torsion bar, which extend inside the bands in a single plane perpendicular to the common axis, and which are joined to one another and intersect at right angles at the common axis, each torsion bar having a first end and a second end, in which, for the first torsion bar, the first and second ends are joined to the first band at an inner cylindrical surface thereof, and in which, for the second torsion bar, the first and second ends are joined to the second band at an inner cylindrical surface thereof.

2. The universal joint according to claim 1, further comprising a first and a second stiffener, which extend inside the bands, the first stiffener extending in a plane containing the common axis and an axis of the first torsion bar, the second stiffener extending in a plane containing the common axis and an axis of the second torsion bar, and each stiffener having a first end and a second end, the first and second ends of the first stiffener being joined to the first band, and the first and second ends of the second stiffener being joined to the second band.

3. The universal joint according to claim 2, wherein each torsion bar is merged with a respective one of the first and second stiffeners joined to the same band.

4. The universal joint according to claim 3, wherein each torsion bar has a first diameter at each end and at a meeting region where the first and second torsion bars meet and a second diameter, which is smaller than the first diameter, between each end and the meeting region.

5. The universal joint according to claim 2, wherein each torsion bar has a first diameter at each end and at a meeting region where the first and second torsion bars meet and a second diameter, which is smaller than the first diameter, between each end and the meeting region.

6. The universal joint according to claim 1, wherein each torsion bar has a first diameter at each end and at a meeting region where the first and second torsion bars meet and a second diameter, which is smaller than the first diameter, between each end and the meeting region.

* * * * *